(12) United States Patent
Jeffrey et al.

(10) Patent No.: US 8,793,976 B2
(45) Date of Patent: Aug. 5, 2014

(54) SULFUR ACCUMULATION MONITORING SYSTEMS AND METHODS

(75) Inventors: Scott Jeffrey, Hartland, MI (US); Michael S. Emmorey, Brighton, MI (US); Jon C. Miller, Fenton, MI (US); Ian J. Mac Ewen, White Lake, MI (US); Steven Ward Majors, Howell, MI (US)

(73) Assignee: GM Global Technology Operations LLC

(*) Notice: Subject to any disclaimer, the term of this patent is extended or adjusted under 35 U.S.C. 154(b) by 237 days.

(21) Appl. No.: 13/427,207

(22) Filed: Mar. 22, 2012

(65) Prior Publication Data

US 2013/0186065 A1 Jul. 25, 2013

Related U.S. Application Data

(60) Provisional application No. 61/588,383, filed on Jan. 19, 2012.

(51) Int. Cl.
*F01N 3/00* (2006.01)
*F01N 3/10* (2006.01)
*F01N 11/00* (2006.01)

(52) U.S. Cl.
CPC ............... *F01N 3/101* (2013.01); *F01N 11/00* (2013.01); *F01N 2570/04* (2013.01); *F01N 2900/1612* (2013.01); *F02D 2200/0818* (2013.01)
USPC ................. 60/285; 60/274; 60/276; 60/301

(58) Field of Classification Search
CPC ......... F01N 3/085; F01N 3/101; F01N 11/00; F01N 2560/027; F01N 2570/04; F01N 2900/1612; F02D 41/028; F02D 2200/0818
USPC ........................... 60/274, 276, 285, 299, 301
See application file for complete search history.

(56) References Cited

U.S. PATENT DOCUMENTS

| | | | |
|---|---|---|---|
| 6,324,893 B1 | 12/2001 | Watanabe et al. | |
| 6,694,244 B2 | 2/2004 | Meyer et al. | |
| 6,802,181 B2 | 10/2004 | Wang et al. | |
| 6,874,313 B2 | 4/2005 | Yurgil et al. | |
| 7,111,451 B2 | 9/2006 | Dou et al. | |
| 7,444,235 B2 | 10/2008 | Anilovich et al. | |
| 7,707,821 B1 | 5/2010 | Legare | |
| 7,900,439 B2 | 3/2011 | Genslak et al. | |
| 8,516,796 B2 | 8/2013 | Wald et al. | |
| 2003/0017603 A1 | 1/2003 | Uchida et al. | |
| 2003/0159432 A1 | 8/2003 | Kobayashi et al. | |
| 2004/0230366 A1* | 11/2004 | Ueda et al. | 701/108 |
| 2004/0244361 A1 | 12/2004 | Tanabe et al. | |
| 2005/0076634 A1* | 4/2005 | Anilovich et al. | 60/274 |
| 2005/0132698 A1* | 6/2005 | Nagaoka et al. | 60/295 |

(Continued)

OTHER PUBLICATIONS

U.S. Appl. No. 12/221,135, filed Aug. 30, 2011, Genslak et al.

(Continued)

*Primary Examiner* — Audrey K Bradley (57) ABSTRACT

A system for a vehicle includes a change determination module, a sulfur determination module, and a final equivalence ratio (EQR) module. The change determination module estimates a change in an amount of sulfur within a catalyst of an exhaust system of the vehicle. The sulfur determination module estimates the amount of sulfur within the catalyst based on the change. The final EQR module selectively adjusts fueling of an engine based on the amount of sulfur.

17 Claims, 5 Drawing Sheets

(56) References Cited

U.S. PATENT DOCUMENTS

| | | |
|---|---|---|
| 2005/0252196 A1 | 11/2005 | Aliakbarzadeh et al. |
| 2007/0227123 A1 | 10/2007 | Iida et al. |
| 2008/0115486 A1 | 5/2008 | Yurgil |
| 2008/0184695 A1 | 8/2008 | Anilovich et al. |
| 2008/0229727 A1 | 9/2008 | Wang et al. |
| 2008/0302087 A1 | 12/2008 | Genslak et al. |
| 2008/0306673 A1 | 12/2008 | Yasui et al. |
| 2009/0030592 A1 | 1/2009 | Mitsutani |
| 2009/0266054 A1 | 10/2009 | Iihoshi et al. |
| 2009/0288391 A1 | 11/2009 | Aoki |
| 2009/0293451 A1 | 12/2009 | Kesse |
| 2010/0101214 A1 | 4/2010 | Herman et al. |
| 2011/0138876 A1 | 6/2011 | Arlt et al. |
| 2012/0031170 A1 | 2/2012 | Matsumoto et al. |
| 2012/0131992 A1 | 5/2012 | Fushiki |

OTHER PUBLICATIONS

P. Rodatz, T. Arlt, B. Odendall, H. Schreiber, B. Kopp; "Robust oxygen sensor and catalyst monitor to reduce the 'gap'"; Presented at IAV GmbH 5th Conference: Apr. 14 and 15, 2011 in Braunschweig, Germany; 10 pages.

* cited by examiner

SULFUR ACCUMULATION MONITORING SYSTEMS AND METHODS

CROSS-REFERENCE TO RELATED APPLICATIONS

This application claims the benefit of U.S. Provisional Application No. 61/588,383, filed on Jan. 19, 2012. The disclosure of the above application is incorporated herein by reference in its entirety.

FIELD

The present disclosure is related to internal combustion engines and more particularly sulfur accumulation monitoring systems and methods for catalysts of internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel control system controls provision of fuel to an engine. The fuel control system includes an inner control loop and an outer control loop. The inner control loop may use data from an exhaust gas oxygen (EGO) sensor located upstream from a catalyst in an exhaust system. The catalyst receives exhaust gas output by the engine.

The inner control loop selectively adjusts the amount of fuel provided to the engine based on the data from the upstream EGO sensor. For example only, when the upstream EGO sensor indicates that the exhaust gas is (fuel) rich, the inner control loop may decrease the amount of fuel provided to the engine. Conversely, the inner control loop may increase the amount of fuel provided to the engine when the exhaust gas is lean. Adjusting the amount of fuel provided to the engine based on the data from the upstream EGO sensor modulates the air/fuel mixture combusted within the engine at approximately a desired air/fuel mixture (e.g., a stoichiometry mixture).

The outer control loop selectively adjusts the amount of fuel provided to the engine based on data from an EGO sensor located downstream from the catalyst. For example only, the outer control loop may use the data from the upstream and downstream EGO sensors to determine an amount of oxygen stored by the catalyst and other suitable parameters. The outer control loop may also use the data from the downstream EGO sensor to correct the data provided by the upstream and/or downstream EGO sensors when the downstream EGO sensor provides unexpected data.

SUMMARY

A system for a vehicle includes a change determination module, a sulfur determination module, and a final equivalence ratio (EQR) module. The change determination module estimates a change in an amount of sulfur within a catalyst of an exhaust system of the vehicle. The sulfur determination module estimates the amount of sulfur within the catalyst based on the change. The final EQR module selectively adjusts fueling of an engine based on the amount of sulfur.

A method for a vehicle includes: estimating a change in an amount of sulfur within a catalyst of an exhaust system of the vehicle; estimating the amount of sulfur within the catalyst based on the change; and selectively adjusting fueling of an engine based on the amount of sulfur.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine produces exhaust and expels the exhaust to an exhaust system. The exhaust travels through the exhaust system to a catalyst. A first exhaust gas oxygen (EGO) sensor measures oxygen in the exhaust upstream of the catalyst and generates an output based on the measured oxygen. A second EGO sensor measures oxygen in the exhaust downstream of the catalyst and generates an output based on the measured oxygen.

An engine control module (ECM) controls an amount of fuel provided to the engine. A base fueling request may be generated based on providing a stoichiometric mixture of air and fuel to the engine. A final fueling request may be generated based on the base fueling request and one or more fueling corrections.

For example, a fueling correction may be generated based on the amount of oxygen measured by the second oxygen sensor. The fueling correction may be adjusted to lean the fueling of the engine when the second oxygen sensor indicates a rich condition is present. Conversely, the fueling correction may be adjusted to richen the fueling of the engine when the second oxygen sensor indicates that a lean condition is present.

The exhaust may include various components, such as hydrocarbons, nitrogen oxides, carbon oxides, and sulfur. Over time, sulfur may accumulate within the catalyst. For example, sulfur may accumulate within the catalyst when a temperature of the catalyst is low. Sulfur may combust at temperatures greater than a predetermined combustion temperature.

When at least a predetermined amount of sulfur is present within the catalyst, the second EGO sensor may erroneously indicate that a lean condition is present downstream of the catalyst. The indication that a lean condition is present may cause an adjustment in the fueling correction to richen the fueling to the engine. However, the adjustment to richen fueling would also be erroneous if the indication of the presence of the lean condition was erroneously caused by accumulation of sulfur within the catalyst.

The ECM of the present disclosure determines the amount of sulfur accumulated within the catalyst as a function of an exhaust flow rate and a temperature of the catalyst. When the amount of sulfur that is present within the catalyst is greater than the predetermined amount, the ECM may disable adjustments to the fueling correction to avoid erroneously richening the fueling in response to an erroneous indication that a lean condition is present. The disablement of adjustments to the fueling correction may also provide one or more other benefits, such as avoidance of erroneous indications of the presence of one or more faults.

Figure 1:
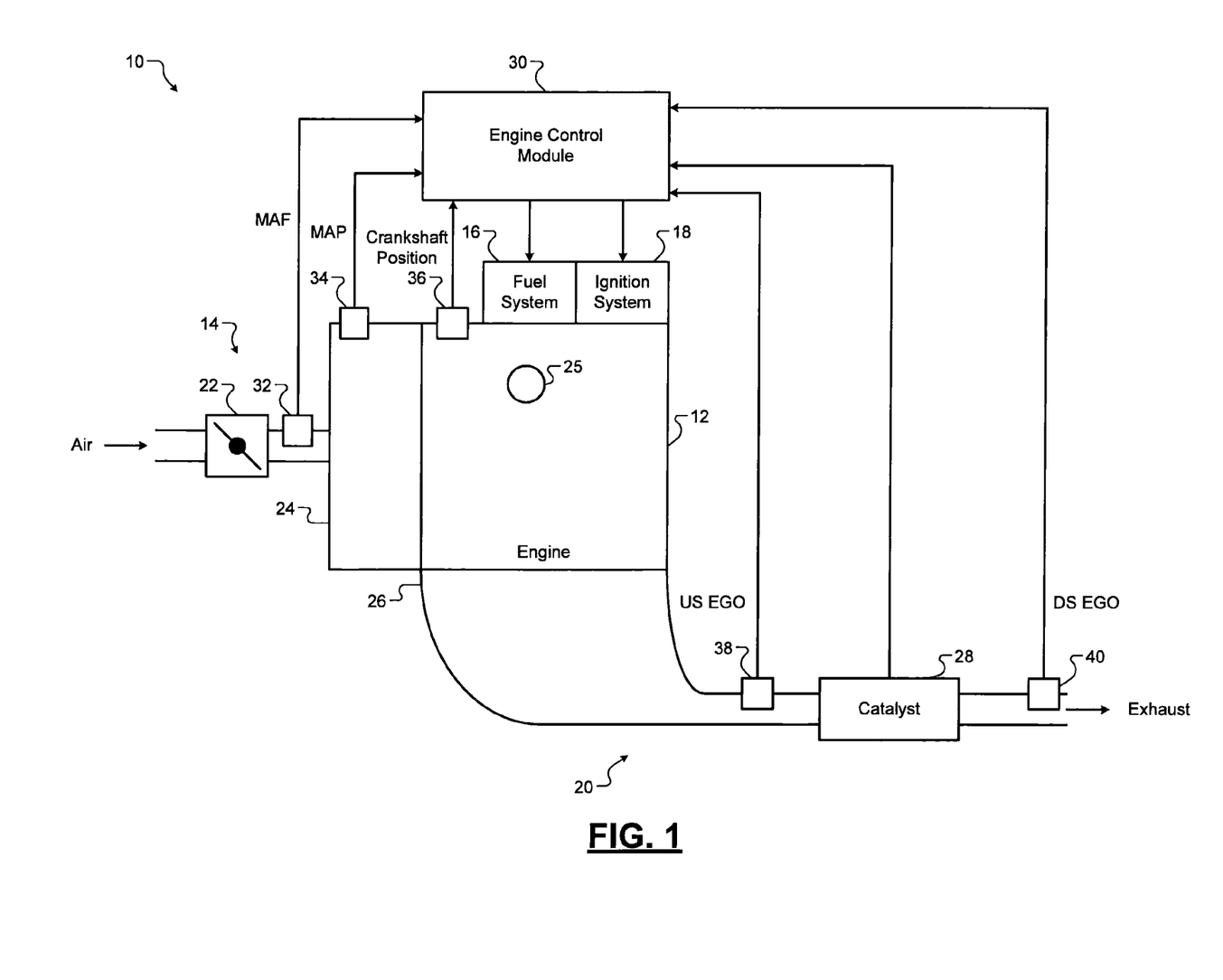
FIG. 1 is a functional block diagram of an example engine system according to the present disclosure.

Referring now to FIG. 1, a functional block diagram of an example engine system 10 is presented. The engine system 10 includes an engine 12, an intake system 14, a fuel system 16, an ignition system 18, and an exhaust system 20. While the engine system 10 is shown and will be described in terms of a gasoline engine, the present application is applicable to diesel engine systems, hybrid engine systems, and other suitable types of engine systems.

The intake system 14 may include a throttle 22 and an intake manifold 24. The throttle 22 controls air flow into the intake manifold 24. Air flows from the intake manifold 24 into one or more cylinders within the engine 12, such as cylinder 25. While only the cylinder 25 is shown, the engine 12 may include more than one cylinder.

The fuel system 16 controls the provision of fuel to the engine 12. The ignition system 18 selectively ignites an air/fuel mixture within the cylinders of the engine 12. The air of the air/fuel mixture is provided via the intake system 14, and the fuel of the air/fuel mixture is provided by the fuel system 16.

Exhaust resulting from combustion of the air/fuel mixture is expelled from the engine 12 to the exhaust system 20. The exhaust system 20 includes an exhaust manifold 26 and a catalyst 28. For example only, the catalyst 28 may include a three-way catalyst (TWC) and/or another suitable type of catalyst. The catalyst 28 receives the exhaust output by the engine 12 and reduces the amounts of various components of the exhaust.

The engine system 10 also includes an engine control module (ECM) 30 that regulates operation of the engine system 10. The ECM 30 communicates with the intake system 14, the fuel system 16, and the ignition system 18. The ECM 30 also communicates with various sensors. For example only, the ECM 30 may communicate with a mass air flow (MAF) sensor 32, a manifold air pressure (MAP) sensor 34, a crankshaft position sensor 36, and other suitable sensors.

The MAF sensor 32 measures a mass flowrate of air flowing into the intake manifold 24 and generates a MAF signal based on the mass flowrate. The MAP sensor 34 measures pressure within the intake manifold 24 and generates a MAP signal based on the pressure. In some implementations, engine vacuum may be measured with respect to ambient pressure. The crankshaft position sensor 36 monitors rotation of a crankshaft (not shown) of the engine 12 and generates a crankshaft position signal based on the rotation of the crankshaft. The crankshaft position signal may be used to determine an engine speed (e.g., in revolutions per minute). The crankshaft position signal may also be used for cylinder identification and one or more other suitable purposes.

The ECM 30 also communicates with exhaust gas oxygen (EGO) sensors associated with the exhaust system 20. For example only, the ECM 30 communicates with an upstream EGO sensor (US EGO sensor) 38, a downstream EGO sensor (DS EGO sensor) 40, and/or one or more other sensors. The US EGO sensor 38 is located upstream of the catalyst 28, and the DS EGO sensor 40 is located downstream of the catalyst 28. The US EGO sensor 38 may be located, for example, at a confluence point of exhaust runners (not shown) of the exhaust manifold 26 or at another suitable location.

The US and DS EGO sensors 38 and 40 measure an amount of oxygen in the exhaust at their respective locations and generate an EGO signal based on the amounts of oxygen. For example only, the US EGO sensor 38 generates an upstream EGO (US EGO) signal based on the amount of oxygen upstream of the catalyst 28. The DS EGO sensor 40 generates a downstream EGO (DS EGO) signal based on the amount of oxygen downstream of the catalyst 28.

The US and DS EGO sensors 38 and 40 may each include a universal EGO (UEGO) sensor (also referred to as a wide band or wide range EGO sensor) or another suitable type of EGO sensor. A switching EGO sensor generates an EGO signal in units of voltage, and switches the EGO signal between a low voltage (e.g., approximately 0.2 V) and a high voltage (e.g., approximately 0.8 V) when the oxygen concentration is lean and rich, respectively. A UEGO sensor generates an EGO signal that corresponds to an equivalence ratio (EQR) of the exhaust gas and provides measurements (e.g., in voltage) between rich and lean.

Figure 2:
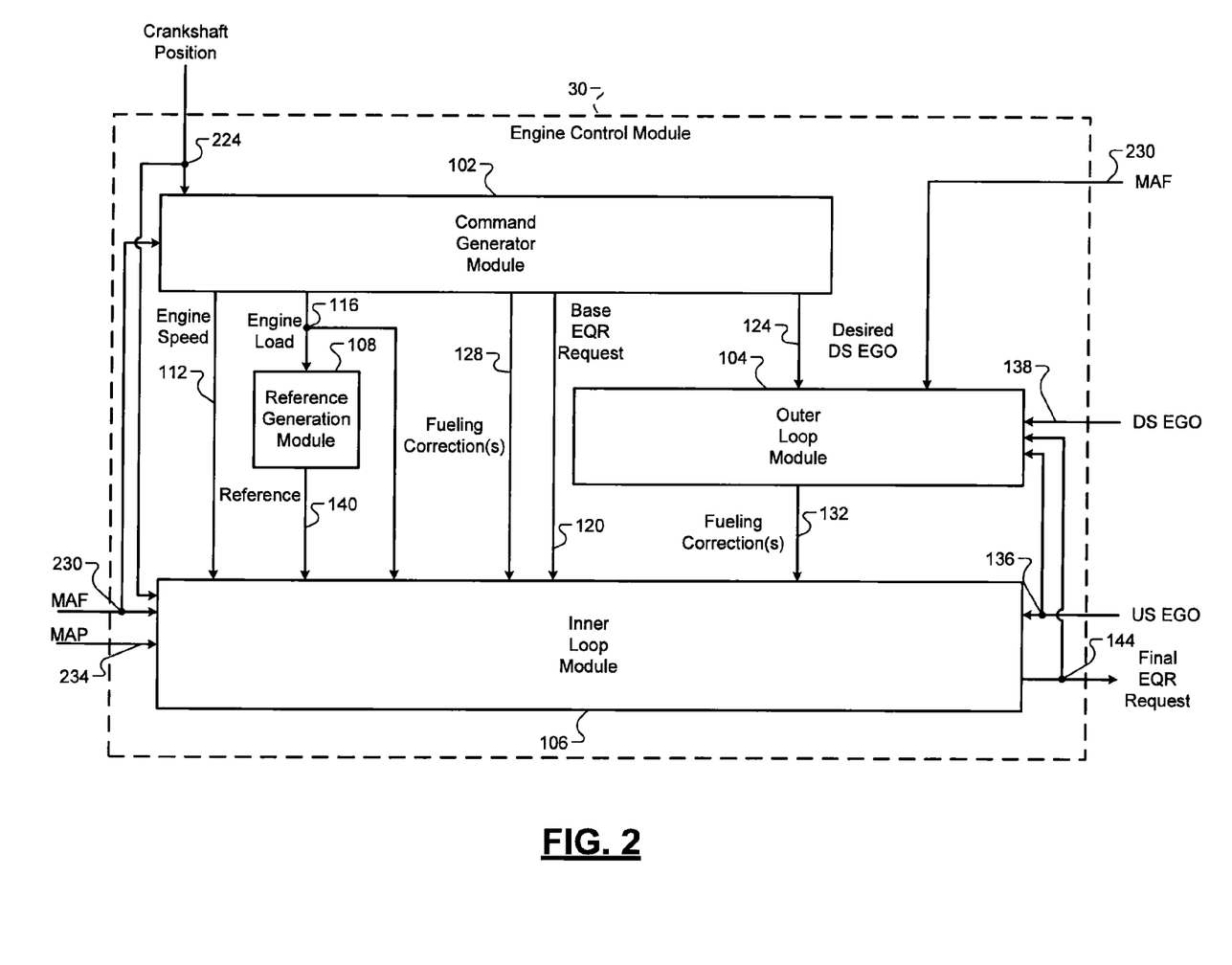
FIG. 2 is a functional block diagram of an example engine control module according to the present disclosure.

Referring now to FIG. 2, a functional block diagram of an example implementation of the ECM 30 is presented. The ECM 30 may include a command generator module 102, an outer loop module 104, an inner loop module 106, and a reference generation module 108.

The command generator module 102 may determine one or more engine operating conditions. For example only, the engine operating conditions may include, but are not limited to, engine speed 112, air per cylinder (APC), engine load 116, and/or other suitable parameters. The APC may be predicted for one or more future combustion events in some engine systems. The engine load 116 may be determined based on, for example, a ratio of the APC to a maximum APC of the engine 12. The engine load 116 may alternatively be determined based on an indicated mean effective pressure (IMEP), engine torque, or another suitable parameter indicative of engine load.

The command generator module 102 generates a base equivalence ratio (EQR) request 120. The base EQR request 120 may be generated based on an APC and to achieve a desired equivalence ratio (EQR) of the air/fuel mixture. For example only, the desired EQR may include a stoichiometric EQR (i.e., 1.0). The command generator module 102 also determines a desired downstream exhaust gas output (a desired DS EGO) 124. The command generator module 102 may determine the desired DS EGO 124 based on, for example, one or more of the engine operating conditions.

The command generator module 102 may also generate one or more open-loop fueling corrections 128 for the base EQR request 120. The open-loop fueling corrections 128 may include, for example, a sensor correction and an error correction. For example only, the sensor correction may correspond to a correction to the base EQR request 120 to accommodate the measurements of the US EGO sensor 38. The error correction may correspond to a correction in the base EQR request 120 to account for errors that may occur, such as errors in the determination of the APC and errors attributable to provision of fuel vapor to the engine 12 (i.e., fuel vapor purging).

The outer loop module 104 may also generate one or more open-loop fueling corrections 132 for the base EQR request 120. The outer loop module 104 may generate, for example, an oxygen storage correction and an oxygen storage maintenance correction. For example only, the oxygen storage correction may correspond to a correction in the base EQR request 120 to adjust the oxygen storage of the catalyst 28 to a desired oxygen storage within a predetermined period. The oxygen storage maintenance correction may correspond to a correction in the base EQR request 120 to modulate the oxygen storage of the catalyst 28 at approximately the desired oxygen storage.

The outer loop module 104 may estimate the oxygen storage of the catalyst 28 based on the US EGO signal 136 and the DS EGO signal 138. The outer loop module 104 may generate the open-loop fueling corrections 132 to adjust the oxygen storage of the catalyst 28 to the desired oxygen storage and/or to maintain the oxygen storage at approximately the desired oxygen storage. The outer loop module 104 may also generate the open-loop fueling corrections 132 to minimize a difference between the DS EGO signal 138 and the desired DS EGO 124.

The outer loop module 104 (see also FIG. 4) also estimates an amount of sulfur that is present within (on surfaces of) the catalyst 28. The outer loop module 104 selectively enables and disables use of one or more of the open-loop fueling corrections 132 based on the amount of sulfur within the catalyst 28.

The inner loop module 106 determines an upstream EGO correction (US EGO correction) based on a difference between the US EGO signal 136 and an expected US EGO. The US EGO correction may correspond to, for example, a correction in the base EQR request 120 to minimize the difference between the US EGO signal 136 and the expected US EGO.

The inner loop module 106 may also determine an imbalance (fueling) correction for the cylinder 25. The inner loop module 106 may determine an imbalance correction for each of the cylinders. The imbalance corrections may also be referred to as individual cylinder fuel correction (ICFCs) or fueling corrections. The imbalance correction for a cylinder may correspond to, for example, a correction in the base EQR request 120 to balance a combustion parameter of the cylinder (e.g., torque) with the combustion parameters of the other cylinders.

The reference generation module 108 generates a reference signal 140. For example only, the reference signal 140 may include a sinusoidal wave, triangular wave, or another suitable type of periodic signal. The reference generation module 108 may selectively vary the amplitude and frequency of the reference signal 140. For example only, the reference generation module 108 may increase the frequency and amplitude as the engine load 116 increases and vice versa. The reference signal 140 may be provided to the inner loop module 106 and one or more other modules.

The reference signal 140 may be used in determining a final EQR request 144 to toggle the EQR of the exhaust gas provided to the catalyst 28 between a predetermined rich EQR and a predetermined lean EQR and vice versa. For example only, the predetermined rich EQR may be approximately 3 percent rich (e.g., an EQR of 1.03), and the predetermined lean EQR may be approximately 3 percent lean (e.g., an EQR of approximately 0.97). Transitioning the EQR may improve the efficiency of the catalyst 28. Additionally, transitioning the EQR from the predetermined rich EQR to the predetermined lean EQR and vice versa may be useful in determining whether faults are present in the US EGO sensor 38, the catalyst 28, the DS EGO sensor 40, and/or one or more other components.

The inner loop module 106 determines the final EQR request 144 based on the base EQR request 120, the fueling corrections 128, the fueling corrections 132, and the reference signal 140. For example only, the inner loop module 106 may determine the final EQR request 144 based on a sum of the base EQR request 120, the fueling corrections 128, the fueling corrections 132, and the reference signal 140. The inner loop module 106 may determine the final EQR request 144 for the cylinder 25 based on a product of the sum and the imbalance correction for the cylinder 25. The ECM 30 controls the fuel system 16 based on the final EQR request 144. For example only, the ECM 30 may control the fuel system 16 using pulse width modulation (PWM).

Figure 3:
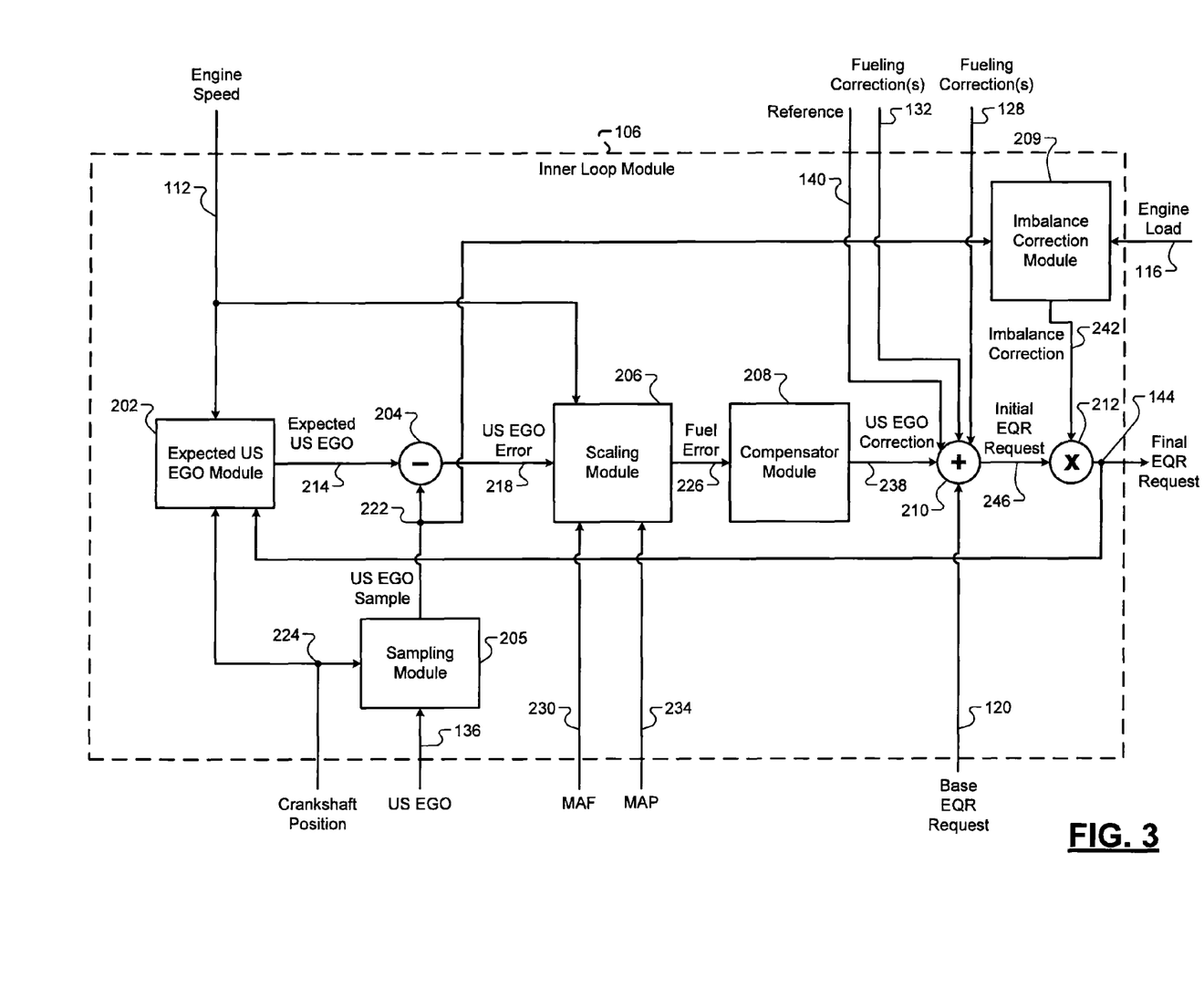
FIG. 3 is a functional block diagram of an example inner loop module according to the present disclosure.

Referring now to FIG. 3, a functional block diagram of an example implementation of the inner loop module 106 is presented. The inner loop module 106 may include an expected US EGO module 202, an error module 204, a sampling module 205, a scaling module 206, and a compensator module 208. The inner loop module 106 may also include an imbalance correction module 209, an initial EQR module 210, and a final EQR module 212.

The expected US EGO module 202 determines the expected US EGO 214. The expected US EGO module 202 determines the expected US EGO 214 based on the final EQR request 144. The expected US EGO 214 corresponds to an expected value of a given sample of the US EGO signal 136. However, delays of the engine system 10 prevent the exhaust gas resulting from combustion from being immediately reflected in the US EGO signal 136. The delays of the engine system 10 may include, for example, an engine delay, a transport delay, and a sensor delay.

The engine delay may correspond to a period between, for example, when fuel is provided to a cylinder of the engine 12 and when the resulting exhaust is expelled from the cylinder. The transport delay may correspond to a period between when the resulting exhaust is expelled from the cylinder and when the resulting exhaust reaches the location of the US EGO sensor 38. The sensor delay may correspond to the delay between when the resulting exhaust reaches the location of the US EGO sensor 38 and when the resulting exhaust is reflected in the US EGO signal 136.

The US EGO signal 136 may also reflect a mixture of the exhaust produced by different cylinders of the engine 12. The expected US EGO module 202 accounts for exhaust mixing and the engine, transport, and sensor delays in determining the expected US EGO 214. The expected US EGO module 202 stores the EQR of the final EQR request 144. The expected US EGO module 202 determines the expected US EGO 214 based on one or more stored EQRs, exhaust mixing, and the engine, transport, and sensor delays.

The error module 204 determines an upstream EGO error (US EGO error) 218 based on a sample of the US EGO signal (i.e., a US EGO sample) 222 taken at a given sampling time and the expected US EGO 214 for the given sampling time. More specifically, the error module 204 determines the US EGO error 218 based on a difference between the US EGO sample 222 and the expected US EGO 214.

The sampling module 205 selectively samples the US EGO signal 136 and provides the samples to the error module 204. The sampling module 205 may sample the US EGO signal 136 at a predetermined rate, such as once per predetermined number of crankshaft angle degrees (CAD) as indicated by a crankshaft position 224 measured using the crankshaft position sensor 36. The predetermined rate may be set based on the number of cylinders of the engine 12, the number of EGO sensors implemented, the firing order of the cylinders, and a configuration of the engine 12. For example only, for a four cylinder engine with one cylinder bank and one EGO sensor, the predetermined rate may be approximately eight CAD based samples per engine cycle or another suitable rate.

The scaling module 206 determines a fuel error 226 based on the US EGO error 218. The scaling module 206 may apply one or more gains or other suitable control factors in determining the fuel error 226 based on the US EGO error 218. For example only, the scaling module 206 may determine the fuel error 226 using the equation:

$$FuelError = \frac{MAF}{14.7} * US\ EGO\ \text{Error}, \qquad (1)$$

where Fuel Error is the fuel error 226, MAF is a MAF 230 measured using the MAF sensor 32, and US EGO Error is the US EGO error 218.

In another implementation, the scaling module 206 may determine the fuel error 226 using the equation:

$$\text{Fuel Error} = k(MAP, RPM) * US\ EGO\ \text{Error}, \qquad (2)$$

where RPM is the engine speed 112, MAP is a MAP 234 measured using the MAP sensor 34, and k is based on a function of the MAP 234 and the engine speed 112. In some implementations, k may be based on a function of the engine load 116.

The compensator module 208 determines the US EGO correction 238 based on the fuel error 226. For example only, the compensator module 208 may employ a proportional-integral (PI) control scheme, a proportional (P) control scheme, a proportional-integral-derivative (PID) control scheme, or another suitable control scheme to determine the US EGO correction 238 based on the fuel error 226.

The imbalance correction module 209 monitors the US EGO samples of the US EGO signal 136. The imbalance correction module 209 determines imbalance values for the cylinders of the engine 12. The imbalance correction module 209 determines an offset value that relates (associates) one of the imbalance values to (with) one of the cylinders of the engine 12. The imbalance correction module 209 correlates the other cylinders of the engine with the other imbalance values, respectively, based on the firing order of the cylinders.

The initial EQR module 210 determines an initial EQR request 246 based on the base EQR request 120, the reference signal 140, the US EGO correction 238, and the open-loop fueling correction(s) 128 and 132. For example only, the initial EQR module 210 may determine the initial EQR request 246 based on the sum of the base EQR request 120, the reference signal 140, the US EGO correction 238, and the open-loop fueling correction(s) 128 and 132.

The final EQR module 212 determines the final EQR request 144 based on the initial EQR request 246 and the imbalance correction 242. More specifically, the final EQR module 212 corrects the initial EQR request 246 based on the imbalance correction 242 that is associated with the next cylinder in the firing order. The final EQR module 212 may, for example, set the final EQR request 144 equal to a product of the initial EQR request 246 and the imbalance correction 242 or to a sum of the initial EQR request 246 and the imbalance correction 242. The fuel system 16 controls the provision of fuel to the next cylinder in the firing order based on the final EQR request 144.

Figure 4:
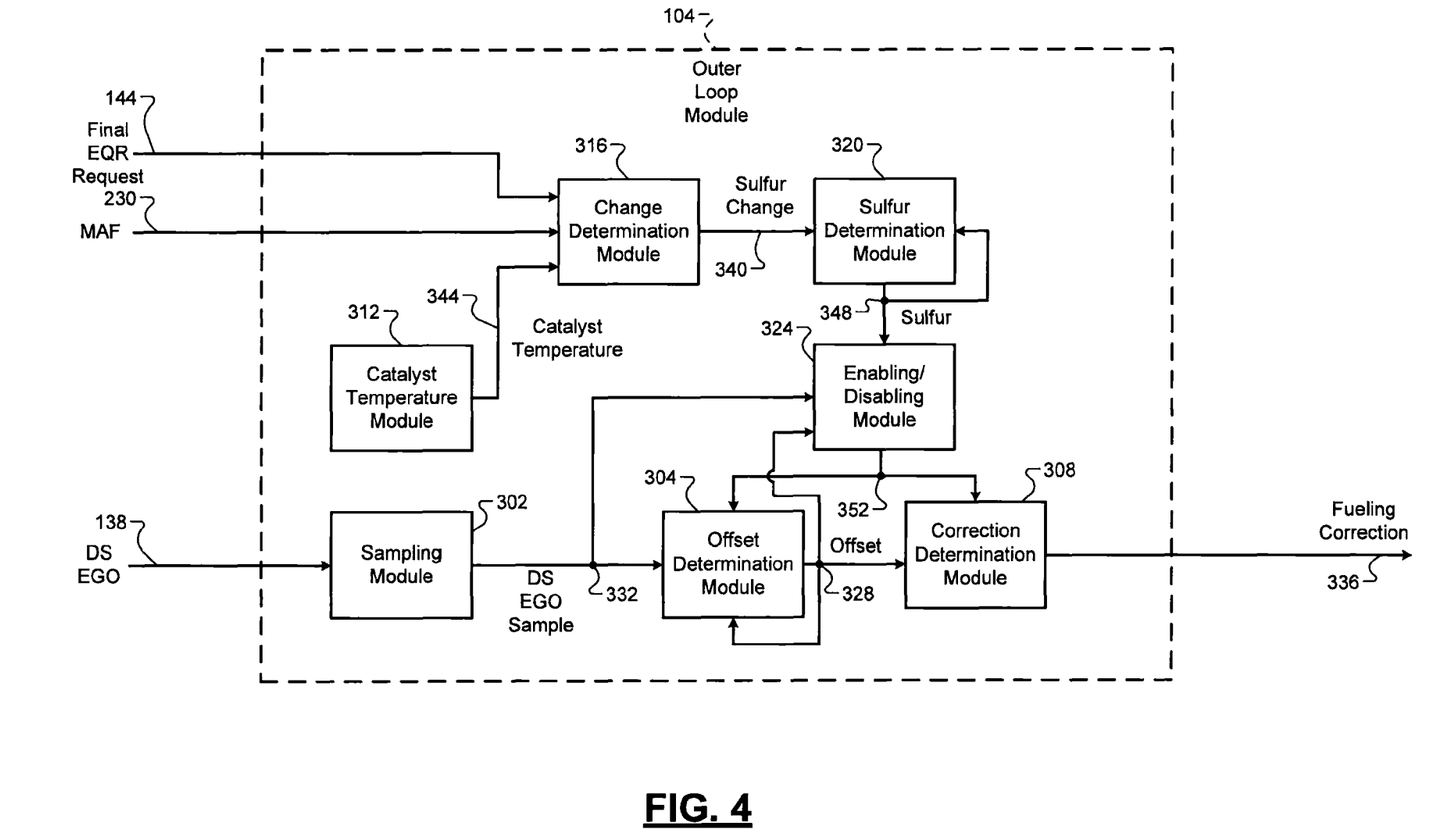
FIG. 4 is a functional block diagram of an example outer loop module according to the present disclosure.

Referring now to FIG. 4, a functional block diagram of an example implementation of the outer loop module 104 is presented. The outer loop module 104 includes a sampling module 302, an offset determination module 304, and a correction determination module 308. The outer loop module 104 may also include a catalyst temperature module 312, a change determination module 316, a sulfur determination module 320, and an enabling/disabling module 324.

The sampling module 302 selectively samples the DS EGO signal 138 and provides the samples to the offset determination module 304. The sampling module 302 may sample the DS EGO signal 138 at a predetermined rate, such as once per predetermined number of CAD as indicated by the crankshaft position 224.

The offset determination module 304 determines an offset value 328 based on the DS EGO samples. The offset determination module 304 may, for example, increment, decrement, or maintain the offset value 328 based on the DS EGO samples. For example only, the offset determination module 304 may increment the offset value 328 by a predetermined amount when a DS EGO sample 332 is less than a lower boundary of a predetermined voltage range. The offset determination module 304 may maintain the offset value 328 when the DS EGO sample 332 is within the predetermined voltage range. The offset determination module 304 may decrement the offset value 328 by the predetermined amount when the DS EGO sample 332 is greater than an upper boundary of the predetermined voltage range. The lower boundary of the predetermined voltage range corresponds to a voltage of the DS EGO signal 138 that may indicate the presence of a lean condition. The upper boundary of the predetermined voltage range corresponds to a voltage of the DS EGO signal 138 that may indicate the presence of a rich condition.

The correction determination module 308 generates one of the open-loop fueling corrections, fueling correction 336, based on the offset value 328. The correction determination module 308 may, for example, increase the fueling correction 336 as the offset value 328 increases, and vice versa.

An increase in the fueling correction 336 causes the final EQR module 212 to richen the final EQR request 144 for future combustion events and shortens the amount of one cycle of the reference signal 140 that lean exhaust is provided to the catalyst 28. Conversely, a decrease in the fueling correction 336 leans the final EQR request 144 for future combustion events and lengthens the amount of one cycle of the reference signal 140 that lean exhaust is provided to the catalyst 28.

The change determination module 316 determines a sulfur change 340. The sulfur change 340 corresponds to a change in an amount of sulfur that is present within the catalyst 28 that occurred over a control loop. The amount of sulfur that is present within the catalyst 28 will be referred to as an accumulated sulfur amount 348. The sulfur change 340 being positive indicates a net increase in the amount of sulfur that is present within the catalyst 28. Conversely, the sulfur change 340 being negative indicates a net decrease in the amount of sulfur that is present within the catalyst 28. The sulfur change 340 being zero indicates that the amount of sulfur that is present within the catalyst 28 has neither increased nor decreased.

The accumulated sulfur amount 348 may be expressed as a percentage (%) between 0% and 100%. When the accumulated sulfur amount 348 is amount of sulfur is 0%, sulfur input to the catalyst 28 may accumulate within the catalyst 28. When the amount of sulfur is 100%, no additional sulfur that is input to the catalyst 28 will accumulate within the catalyst 28.

The change determination module 316 determines the sulfur change 340 based on an exhaust flow rate and a catalyst temperature 344. The change determination module 316 may determine the sulfur change 340 further based on the EQR of the final EQR request 144. For example only, the change determination module 316 may determine the sulfur change 340 using one or more functions and/or mappings that relate the exhaust flow rate, the catalyst temperature 344, and the EQR of the final EQR request 144 to the sulfur change 340. The one or more functions and/or mappings may be generated to account for the non-linearity between the exhaust flow rate and the catalyst temperature 344. The change determination module 316 may set the sulfur change 340 to zero when fueling to the engine 12 is cut off, such as during deceleration fuel cutoff (DFCO) or other fuel cutoff events.

The MAF 230 may be used as the exhaust flow rate, the exhaust flow rate may be measured, or the exhaust flow rate may be obtained in another suitable manner. The catalyst temperature module 312 may determine or estimate the catalyst temperature 344, for example, using a model of the catalyst temperature 344 as a function of one or more parameters. In various implementations, the catalyst temperature 344 may be measured or obtained in another suitable manner. The catalyst temperature 344 corresponds to a temperature of the catalyst 28.

The sulfur determination module 320 determines the accumulated sulfur amount 348 based on the sulfur change 340. More specifically, the sulfur determination module 320 increases or decreases the accumulated sulfur amount 348 based on the sulfur change 340. For example only, the sulfur determination module 320 may set the accumulated sulfur amount 348 equal to a previous value of the accumulated sulfur amount 348 plus the sulfur change 340.

The enabling/disabling module 324 selectively generates a disable signal 352 based on the accumulated sulfur amount 348. The enabling/disabling module 324 may generate the disable signal 352 when the accumulated sulfur amount 348 is greater than a first predetermined amount. The first predetermined amount may be calibratable and may be set, for example, based on an amount above which the DS EGO sensor 40 may erroneously indicate that the exhaust is lean due to the accumulation of sulfur within the catalyst 28. For example only, the first predetermined amount may be approximately 75%, approximately 80%, or another suitable amount.

The enabling/disabling module 324 may determine whether to generate the disable signal 352 further based on the DS EGO sample 332 and/or the offset value 328. For example only, the enabling/disabling module 324 may generate the disable signal 352 when the accumulated sulfur amount 348 is greater than the first predetermined amount and at least one of: (i) the DS EGO sample 332 is less than a predetermined voltage; and (ii) the offset value 328 is greater than a predetermined value. The predetermined voltage may be calibratable and may be set to approximately 600-approximately 700 millivolts (mV) or another suitable voltage. The predetermined value may be calibratable and may be set to a value at which the fueling correction 336 will richen the final EQR request 144 by at least a predetermined amount (EQR).

When the accumulated sulfur amount 348 is greater than the first predetermined amount, the DS EGO sensor 40 may erroneously indicate that the exhaust gas downstream of the catalyst 28 is lean. Thus, the DS EGO sample 332 being less than the predetermined voltage and/or the offset value 328 being greater than the predetermined value (which may occur in response to multiple DS EGO samples being less than the predetermined range) may be used to verify that the accumulated sulfur amount 348 is greater than the first predetermined amount and that the disable signal 352 should be generated.

The enabling/disabling module 324 may output the disable signal 352 to the offset determination module 304 and the correction determination module 308. In response to the generation of the disable signal 352, the offset determination module 304 may maintain the offset value 328 regardless of whether DS EGO samples are less than the lower boundary of the predetermined voltage range. This may prevent the further richening of the fueling that may occur if the DS EGO sensor 40 erroneously indicates that the exhaust gas downstream of the catalyst 28 is lean. In response to the generation of the disable signal 352, the correction determination module 308 may maintain the fueling correction 336.

The enabling/disabling module 324 may stop generating the disable signal 352, for example, when the accumulated sulfur amount 348 is less than a second predetermined amount. The second predetermined amount may be less than the first predetermined amount where the enabling/disabling module 324 generates the disable signal 352, for example, to provide hysteresis. For example only, the second predetermined amount may be approximately 50% or another suitable value.

Figure 5:
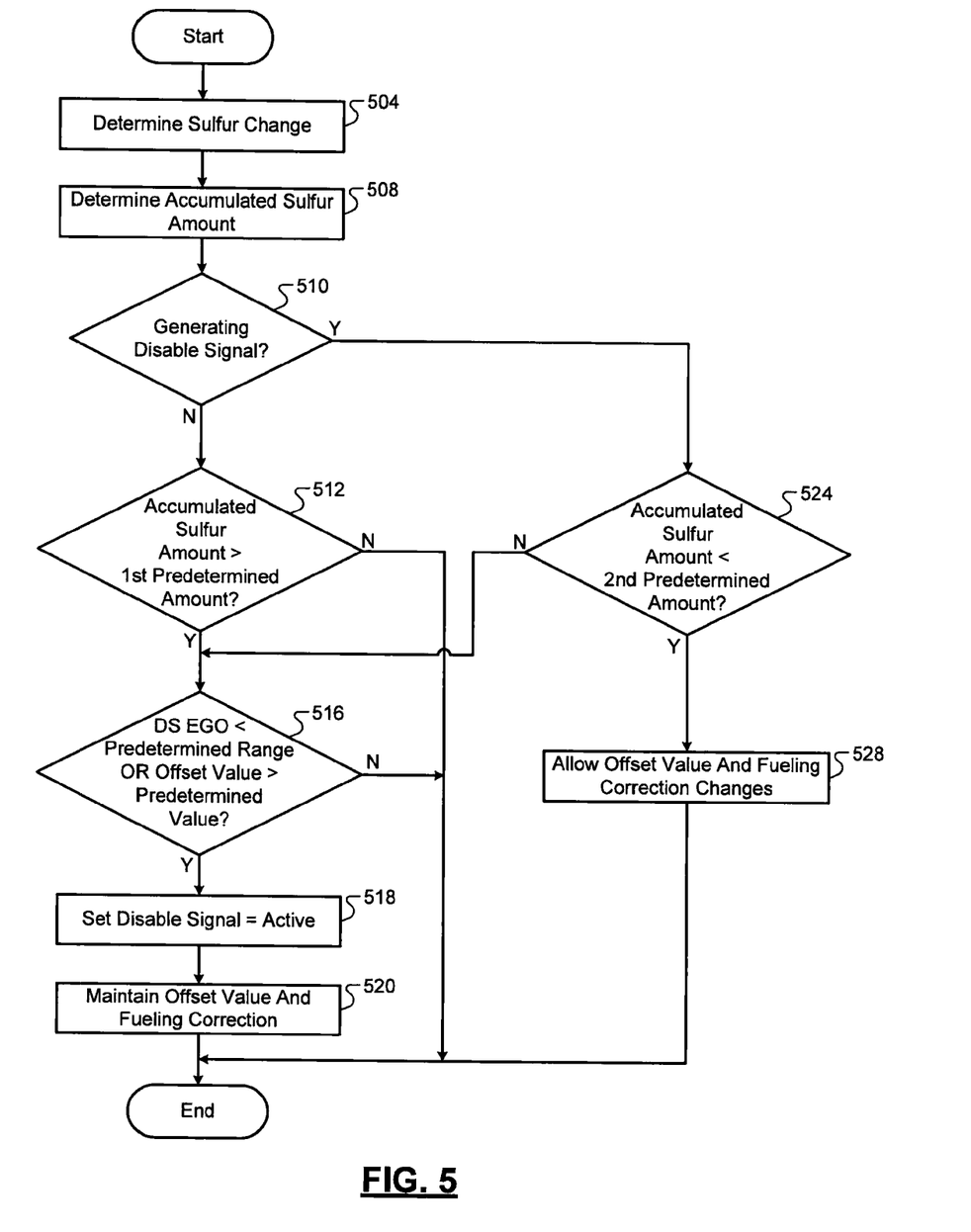
FIG. 5 is a flowchart depicting an example method of determining an amount of sulfur accumulated within a catalyst and controlling fueling based on the amount of sulfur according to the present disclosure.

Referring now to FIG. 5, a flowchart depicting an example method of determining the amount of sulfur accumulated within the catalyst 28 and controlling fuel correction is presented. Control may begin with 504 where control determines the sulfur change 340. Control determines the sulfur change 340 using one or more functions and/or mappings that relate the catalyst temperature 344 and the exhaust flow rate to the sulfur change 340. Control may determine the sulfur change 340 further based on the EQR of the final EQR request 144.

At 508, control determines the accumulated sulfur amount 348. Control may increment or decrement the last value of the accumulated sulfur amount 348 based on the sulfur change 340. For example only, control may set the accumulated sulfur amount 348 equal to a sum of the last value of the accumulated sulfur amount 348 and the sulfur change 340.

Control may determine whether the disable signal 352 is currently being generated at 510. If true, adjustments to the offset value 328 and the fueling correction 336 can currently be made based on the DS EGO signal 138, and control may continue with 512. If false, adjustments to the offset value 328 and the fueling correction 336 are currently disabled, and control may continue with 524, which is discussed further below.

At 512, control may determine whether the accumulated sulfur amount 348 is greater than the first predetermined amount. If true, control may continue with 516. If false, control may end. For example only, the first predetermined amount may be approximately 75%, approximately 80%, or another suitable amount above which the DS EGO sensor 40 may erroneously indicate that the exhaust gas is lean due to accumulation of sulfur within the catalyst 28.

At 516, control may determine whether the DS EGO sample 332 is less than the predetermined voltage and/or whether the offset value 328 is greater than the predetermined value. If true, the DS EGO sensor 40 may erroneously indicate that the exhaust gas is lean due to accumulation of sulfur within the catalyst 28, and control may continue with 518. If false, control may end. In various implementations, if false, control may set the disable signal 352 to the inactive state and enable adjustments of the offset value 328 and the fueling correction 336.

Control sets the disable signal 352 to the active state at 518, and control continues with 520. At 520, control disables adjustment of the offset value 328 and the fueling correction 336 at 520 to maintain the offset value 328 and the fueling correction 336. In this manner, an erroneous indication by the DS EGO sensor 40 that the exhaust gas is lean that may be caused by the accumulation of sulfur within the catalyst 28 will not cause fueling of the engine 12 to be enriched.

When the disable signal 352 is being generated at 510, control may determine whether the accumulated amount of sulfur is less than the second predetermined value at 524. If true, control may enable adjustments of the offset value 328 and the fueling correction 336 at 528, and control may end. If false, control may continue with 516, as discussed above. While control is shown and discussed as ending, the example of FIG. 5 may be illustrative of a control loop and control may return to 504.

The above description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for a vehicle, comprising:
    a first electronic circuit configured to estimate a change in an amount of sulfur within a catalyst of an exhaust system of the vehicle;
    a second electronic circuit configured to estimate the amount of sulfur within the catalyst based on the change;
    a third electronic circuit configured to determine an offset value based on a comparison of an output of an exhaust gas oxygen sensor located downstream of the catalyst and a predetermined range,
    wherein the predetermined range is defined by a first predetermined value that corresponds to a lean condition and a second predetermined value that corresponds to a rich condition;
    a fourth electronic circuit configured to determine a fueling correction based on the offset value;
    a fifth electronic circuit configured to control fueling of an engine based on the fueling correction and to selectively adjust the fueling of the engine based on the amount of sulfur; and
    a sixth electronic circuit configured to selectively generate a signal based on the amount of sulfur within the catalyst,
    wherein the third electronic circuit is configured to maintain the offset value in response to the generation of the signal, and
    wherein the fourth electronic circuit is configured to maintain the fueling correction in response to the generation of the signal.

2. The system of claim 1 wherein the sixth electronic circuit is configured to generate the signal when the amount of sulfur is greater than a predetermined amount.

3. The system of claim 1 wherein the first, second, third, fourth, fifth, and sixth electronic circuits include at least one of an Application Specific Integrated Circuit (ASIC), a field programmable gate array (FPGA), a processor, and a combinational logic circuit.

4. The system of claim 1 wherein the sixth electronic circuit is configured to generate the signal when:
    the amount of sulfur is greater than a predetermined amount;
    the output is less than the first predetermined value; and
    the offset value is greater than a third predetermined value.

5. The system of claim 1 wherein:
    the third electronic circuit is configured to increment the offset value by a predetermined amount when the output is less than the first predetermined value and to decrement the offset value by the predetermined amount when the output is greater than the second predetermined value;
    when the signal is not generated, the fourth electronic circuit is configured to increase the fueling correction when the offset value increases and to decrease the fueling correction when the offset value decreases; and
    the fifth electronic circuit is configured to richen the fueling of the engine when the fueling correction increases and to lean the fueling of the engine when the fueling correction decreases.

6. The system of claim 1 wherein the first electronic circuit is configured to estimate the change based on a flow rate of exhaust through the exhaust system and a temperature of the catalyst.

7. The system of claim 6 wherein the first electronic circuit is configured to estimate the change further based on the fueling of the engine.

8. The system of claim 1 wherein the second electronic circuit is configured to estimate the amount of sulfur within the catalyst based on the change and a previous value of the amount of sulfur within the catalyst.

9. The system of claim 8 wherein the second electronic circuit is configured to set the amount of sulfur within the catalyst equal to a sum of the change and the previous value.

10. A method for a vehicle, comprising:
    estimating a change in an amount of sulfur within a catalyst of an exhaust system of the vehicle;
    estimating the amount of sulfur within the catalyst based on the change;

determining an offset value based on a comparison of an output of an exhaust gas oxygen sensor located downstream of the catalyst and a predetermined range, wherein the predetermined range is defined by a first predetermined value that corresponds to a lean condition and a second predetermined value that corresponds to a rich condition;

determining a fueling correction based on the offset value;

controlling fueling of an engine based on the fueling correction;

selectively adjusting the fueling of the engine based on the amount of sulfur;

selectively generating a signal based on the amount of sulfur within the catalyst;

maintaining the offset value in response to the generation of the signal; and maintaining the fueling correction in response to the generation of the signal.

11. The method of claim 10 further comprising generating the signal when the amount of sulfur is greater than a predetermined amount.

12. The method of claim 10 further comprising generating the signal when:

the amount of sulfur is greater than a predetermined amount;

the output is less than the first predetermined value; and the offset value is greater than a third predetermined value.

13. The method of claim 10 further comprising:

incrementing the offset value by a predetermined amount when the output is less than the first predetermined value;

decrementing the offset value by the predetermined amount when the output is greater than the second predetermined value;

when the signal is not generated, increasing the fueling correction when the offset value increases and decreasing the fueling correction when the offset value decreases;

richening the fueling of the engine when the fueling correction increases; and leaning the fueling of the engine when the fueling correction decreases.

14. The method of claim 10 further comprising estimating the change based on a flow rate of exhaust through the exhaust system and a temperature of the catalyst.

15. The method of claim 14 further comprising estimating the change further based on the fueling of the engine.

16. The method of claim 10 further comprising estimating the amount of sulfur within the catalyst based on the change and a previous value of the amount of sulfur within the catalyst.

17. The method of claim 16 further comprising setting the amount of sulfur within the catalyst equal to a sum of the change and the previous value.

* * * * *